United States Patent
Cheston et al.

(10) Patent No.: US 6,862,681 B2
(45) Date of Patent: Mar. 1, 2005

(54) METHOD AND SYSTEM FOR MASTER BOOT RECORD RECOVERY

(75) Inventors: Richard Wayne Cheston, Morrisville, NC (US); Richard Alan Dayan, Wake Forest, NC (US); Randall Scott Springfield, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 09/906,506

(22) Filed: Jul. 16, 2001

(65) Prior Publication Data

US 2003/0014619 A1 Jan. 16, 2003

(51) Int. Cl.[7] ............................................. G06F 15/177
(52) U.S. Cl. ............................ 713/2; 713/1; 713/100; 714/2; 714/5; 714/100
(58) Field of Search .............................. 713/1, 2, 100; 714/5, 6, 7, 16, 20, 27, 42

(56) References Cited

U.S. PATENT DOCUMENTS

| | | |
|---|---|---|
| 5,022,077 A | 6/1991 | Bealkowski et al. |
| 5,230,052 A | 7/1993 | Dayan et al. |
| 5,388,267 A | 2/1995 | Chan et al. |
| 5,701,477 A | 12/1997 | Chejlava, Jr. |
| 5,742,758 A * | 4/1998 | Dunham et al. ............. 713/200 |
| 5,809,230 A * | 9/1998 | Pereira ....................... 713/200 |
| 5,974,567 A | 10/1999 | Dickson, Jr. et al. |
| 6,003,130 A | 12/1999 | Anderson |
| 6,173,291 B1 * | 1/2001 | Jenevein ..................... 707/200 |
| 6,175,904 B1 * | 1/2001 | Gunderson .................. 711/162 |
| 6,195,695 B1 * | 2/2001 | Cheston et al. ............. 709/221 |
| 6,205,558 B1 * | 3/2001 | Sobel ........................... 714/15 |
| 6,304,965 B1 * | 10/2001 | Rickey ........................... 713/2 |
| 6,347,371 B1 * | 2/2002 | Beelitz et al. ................. 713/2 |
| 6,453,414 B1 * | 9/2002 | Ryu ............................... 713/2 |
| 6,523,125 B1 * | 2/2003 | Kohno et al. ............... 713/320 |
| 6,542,979 B1 * | 4/2003 | Eckardt ....................... 711/173 |
| 6,658,563 B1 * | 12/2003 | Ice et al. ......................... 713/2 |
| 6,711,660 B1 * | 3/2004 | Milne et al. ................. 711/173 |
| 6,748,553 B2 * | 6/2004 | McBride et al. ............... 714/15 |

FOREIGN PATENT DOCUMENTS

| | | | | |
|---|---|---|---|---|
| DO | 419097 A | * | 3/1999 | ........... G06F/00/00 |
| JP | 410240541 A | * | 11/1998 | ........... G06F/9/445 |

OTHER PUBLICATIONS

IBM TDB vol. 36, issue No. 6B, p. # 295–298; title: "Auto_Bios Image Configurator"; dtd: Jun. 1, 1993.*
IBM TDB vol. 42, issue No. 419, title: "Backup Master Boot Record for Virusrecovery"; dtd: Mar. 1, 1999.*
IBM TDB vol. 42, issue No. 419, title: "Backup Master Boot Record for Virusrecovery"; dtd: Mar. 1, 1999.*

* cited by examiner

Primary Examiner—Lynne H. Browne
Assistant Examiner—Nitin C. Patel
(74) Attorney, Agent, or Firm—George E. Grosser; Dillon & Yudell LLP

(57) ABSTRACT

A method and system for recovering a master boot record within a data processing system. In accordance with the method of the present invention, a master boot record recovery setup utility is invoked by a user. In response to invoking the master boot record recovery utility, the master boot record in a first bootable device is copied to an alternate non-volatile storage device. A recovery flag is set within BIOS indicating that the MBR has been securely copied. In response to a failed boot attempted from the first boot device, the copy of said master boot record within said alternate non-volatile storage device is accessed and utilized to boot the system.

20 Claims, 4 Drawing Sheets

METHOD AND SYSTEM FOR MASTER BOOT RECORD RECOVERY

BACKGROUND OF THE INVENTION

1. Technical Field

The present invention relates in general to personal computer systems, and in particular to a method and system for recovering from a hard disk failure. More particularly, the present invention relates to setting up and executing a protected copy of a master boot record such that upon a booting failure, the system can be recovered without the need for an external bootable media.

2. Description of the Related Art

Personal computer systems are well known in the art. Personal computer systems in general, and IBM Personal Computers in particular, have attained widespread use of providing computing capacity throughout modern society. A personal computer can typically be defined as a desktop, floor standing, or a portable microcomputer that is comprised of a system unit having a single central processing unit (CPU) and associated volatile and non-volatile memory, including random access memory (RAM) and Basic Input Output System (BIOS) flash memory, a video display controller, a video display terminal (also known as a "system monitor"), a keyboard, one or more diskette drives, a fixed storage device (also known as a "hard drive"), a pointer device, and an optional printer. One of the distinguishing characteristics of these systems is the use of a system planar or "motherboard" to electrically connect the constituent components together. Personal computers are designed primarily to supply independent computing power to a single user and are inexpensively priced for purchase by individuals or small businesses. An exemplary personal computer system is IBM's Netvista A40.

When a user activates a computer power switch, or presses a reset button, the computer "boots" itself. Booting initiates an automatic start program routine that clears memory, executes diagnostics, loads a computer operating system software program into memory from hard disk storage or other storage devices such as CD ROM, and executes other well known routines that prepare the computer for operation.

In personal computers that are compatible with the IBM PERSONAL COMPUTER, the automatic start program includes a set of programs called BIOS that are encoded in flash memory. The BIOS facilitates the transfer of data and instructions between a CPU and peripheral devices such as disk drives. Computer systems are designed to perform functional tests from the BIOS every time the computer is turned on.

Preferably, the bootstrap program initializes all aspects of the data processing system, from CPU registers to device controllers to memory contents. The bootstrap program must know how to load an operating system and to start execution of the operating system. To load the operating system, the bootstrap program typically locates an operating system kernel, stored within a hard disk, loads the operating system kernel, and transfers control to an initial address provided by the operating system kernel. Typically, the operating system is loaded into RAM within the data processing system. Once loaded and initialized, the operating system controls the execution of programs and may provide services such as resource allocation, scheduling, input/output control, and data management. The operating system also determines the graphical user interface (GUI) provided for displaying data.

In most data processing systems, the bootstrap program is stored in two places. First, part of the bootstrap program may be stored in flash memory. The flash memory is an ideal memory location because it does not require initialization and is always available. However, the part of the bootstrap program stored in flash memory does not include configuration data. The configurable aspects of the bootstrap program are preferably stored at a fixed memory location available to the data processing system. A central component of the configurable aspects of booting is known as the master boot record (MBR). The MBR includes a small program that is executed when a computer boots up. Typically, the MBR resides on the first sector of the hard disk. The program begins the boot process by looking up the partition table to determine which partition to use for booting. It then transfers program control to the boot sector of that partition, which continues the boot process. An MBR virus is a common type of virus that replaces the MBR with an invalid code. Since the MBR executes every time a computer is started or reset, this type of virus is extremely dangerous. MBR viruses may enter a system through a removable diskette, a modem, or a network interface.

The MBR includes information that identifies how and where an operating system is located on the hard disk such that the operating system can be booted (loaded) into the computer's main memory. The MBR is sometimes referred to as the "partition sector" or the "master partition table" because it includes a table that identifies the location of each partition that has been formatted onto the hard disk. In addition to the partition table, the MBR also includes a program that reads the boot sector record of the partition containing the operating system to be booted into system memory. In turn, that record contains a program that loads the rest of the operating system into system memory. The information contained within the MBR is critical because without it the system cannot access and load the operating system and would be non-functional. Once a virus destroys this information it is not possible to utilize the system unless an alternate boot record is available.

Removable storage media such as diskettes or CD ROMs are conventionally utilized to store a copy of the MBR that may be restored in case of a boot failure. Such a method relies, however, on the diligence of an individual to maintain and keep track of backup diskettes and is therefore inconvenient and potentially unreliable and may also be subject to MBR viruses if the object diskette has been utilized within an infected system. In addition, maintaining an externally stored copy of the MBR is particularly difficult for handicapped persons having limited mobility.

It can therefore be appreciated that a need exists for an improved technique for ensuring that a viable backup copy of a master boot record is available in case of a failure of the primary copy on the hard disk. The present invention addresses such a need.

SUMMARY OF THE INVENTION

A method and system for recovering a master boot record within a data processing system are disclosed herein. In accordance with the method of the present invention, a master boot record recovery setup utility is invoked by a user. In response to invoking the master boot record recovery utility, the master boot record in a first bootable device is copied to an alternate non-volatile storage device. A recovery flag is set within BIOS indicating that the MBR has been securely copied. In response to a failed boot attempted from the first boot device, the copy of said master boot record within said alternate non-volatile storage device is accessed and utilized to boot the system. In an alternate embodiment, a copy of the MBR included within each of multiple devices within a boot list can also be stored within the alternate non-volatile device.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

This invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention.

The present invention may be executed in a variety of computers under a number of different bootstrap programs and operating systems. The computer may be, for example, a personal computer, a midrange computer, a network computer or a mainframe computer. In addition, the computer may be a stand-alone system or part of a network such as a local-area network (LAN) or a wide-area network (WAN). For the purposes of illustration, a preferred embodiment of the present invention, as described below, is implemented on a personal computer such as the Netvista A40, manufactured by International Business Machines Corporation.

Figure 1:
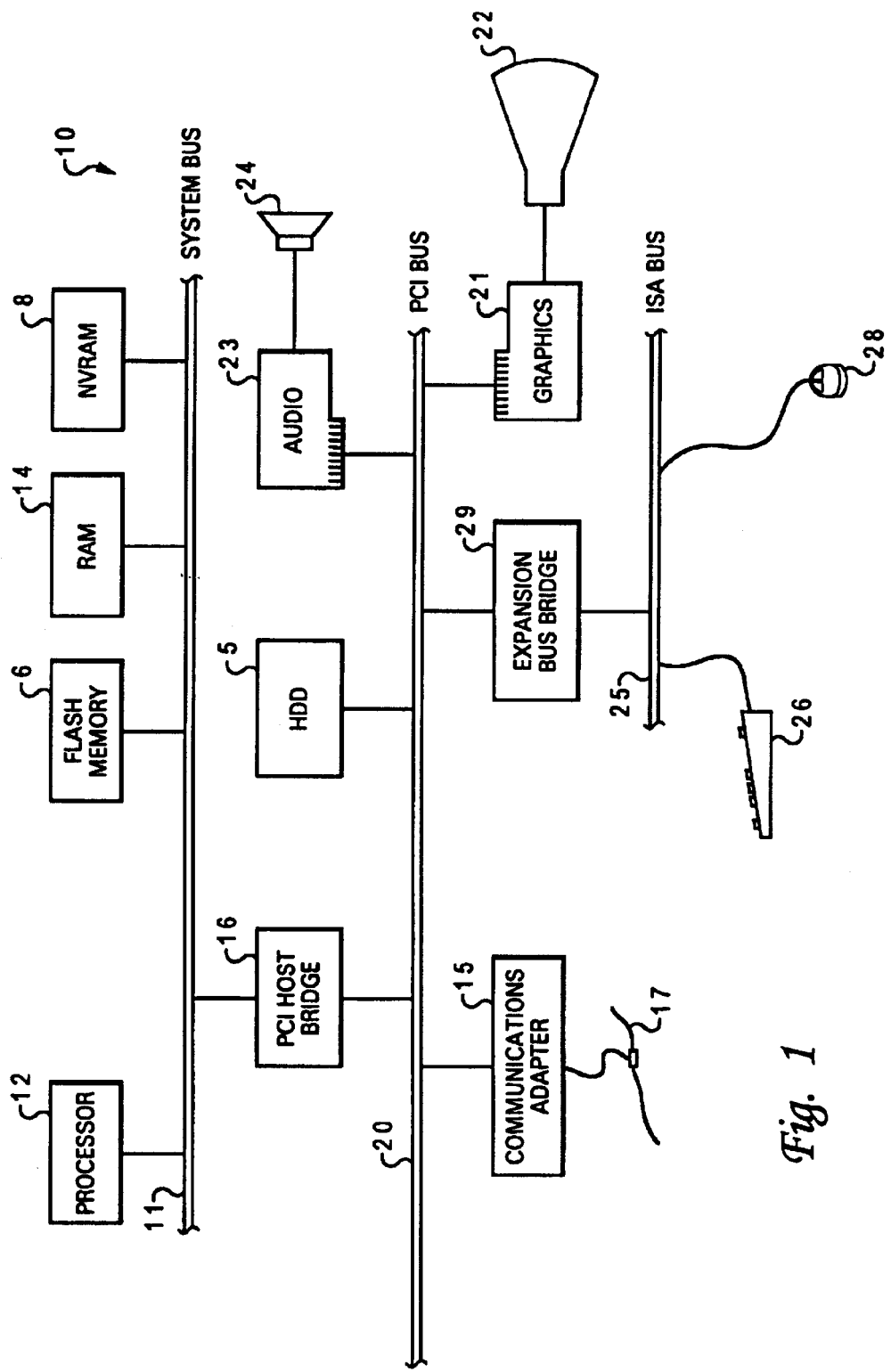
FIG. 1 depicts a block diagram of a typical computer system wherein a preferred embodiment of the present invention may be implemented.

Referring now to the drawings and in particular to FIG. 1, there is depicted a block diagram of a typical personal computer system that may utilize a preferred embodiment of the present invention. As shown, a central processing unit (CPU) 12, a flash memory 6, a Random-Access Memory (RAM) 14, and a non-volatile RAM (NVRAM) 8 are connected to a system bus 11 of a personal computer system 10. CPU 12, RAM 14, flash memory 6, and NVRAM 8 are also coupled to a peripheral component interface (PCI) local bus 20 of personal computer system 10 through a PCI host bridge 16. Flash memory 6 is a special type of electronically erasable progammable read-only memory (EEPROM) that can be erased and reprogrammed in blocks instead of one byte at a time. PCI host bridge 16 provides a low latency path through which processor 12 may directly access PCI devices mapped anywhere within bus memory and/or input/output (I/O) address spaces. PCI host bridge 16 also provides a high bandwidth path for allowing PCI devices to directly access RAM 14.

Also attaching to PCI local bus 20 are a hard disk drive 5, a communications interface 15, and an expansion bus bridge 29. Communications interface 15 connects personal computer system 10 to a network 17. Expansion bus bridge 29, such as a PCI-to-industry standard architecture (ISA) bus bridge, may be utilized for coupling ISA bus 25 to PCI local bus 20. As shown, a keyboard 26 and a mouse 28 are attached to ISA bus 25 for performing certain basic I/O functions. In addition, an audio adapter 23 is attached to PCI local bus 20 for controlling audio output through speaker 24. A graphics adapter 21 is also attached to PCI local bus 20 for controlling visual output through display monitor 22.

A boot process for personal computer system 10 typically includes executing a bootstrap program which performs system initialization and loads an operating system by locating and executing an operating system loader from a partition within hard disk drive 5 into system memory (i.e., RAM 14). Utilizing the operating system loader, the bootstrap program loads operating system components such as device drivers, preferably into RAM 14, and initializes operation thereby.

Preferably, the bootstrap program is stored within flash memory 6. Further portions of the bootstrap program may also be stored in any other suitable machine-readable media such as RAM 14 and other disk and/or tape drive (e.g. magnetic diskette, magnetic tape, CD-ROM, optical disk, or other suitable storage media). While flash memory 6 contains static boot programs, NVRAM 8 and hard disk drive 5 preferably contain configurable settings for the boot program to utilize. Any suitable non-volatile machine-readable media may retain the operating system loader and associated operating system (OS), such as disk drive 5 and/or tape drive (e.g. magnetic diskette, magnetic tape, CD-ROM, optical disk, or other suitable storage media). Any suitable OS such as IBM's OS/2 operating system may direct CPU 12.

During the boot process of personal computer system 10, prior to the operating system taking over, a basic input output system (BIOS) code provides a the computer system a built-in starter kit to load and operate the rest of the software from hard disk drive 5. The BIOS is typically stored in flash memory 6 and is responsible for booting the computer by providing a basic set of instructions. The BIOS code performs all the tasks that need to be executed during a computer system startup including: power-on self-test (POST) which boots an operating system from hard disk drive 5, and providing an interface to the underlying hardware (an audio adapter 23 and graphics adapter 21, for example) for the operating system in the form of a library of interrupt handlers.

The BIOS first executes the POST code when it boots the computer system. The POST code is a built-in diagnostic program, normally stored within flash memory 6, which checks the hardware interfaces to ensure that all requisite hardware is present and functioning correctly before the BIOS begins the actual boot. During the boot process, POST continues with additional tests (such as memory tests for RAM 14 and NVRAM 8) as the boot process proceeds.

A typical boot sequence implemented by the BIOS include searching for a drive to boot from. Most modem BIOSes include a setting that determines whether the system should first try to boot from a removable media drive (not depicted) or first try hard disk drive 5. In a preferred embodiment of the present invention, the BIOS code stored within flash memory 6, must access a "boot list" of alternative bootable devices that may alternatively be used to boot the system. The contents of the boot list provide a boot sequence setting that controls the order that the BIOS code utilizes to look for a boot device from which to load the operating system. For example, if hard disk drive 5 comprises multiples disks, the boot list may allow the system to attempt to boot from an alternate disk if a first attempt on a first disk fails.

Having identified a target boot device from the boot list, the BIOS code looks for boot information to start the operating system boot process. If it is searching hard disk drive 5, the BIOS looks for a master boot record (MBR) at cylinder 0, head 0, sector 1 (i.e., the first sector of the disk). The nature of cylinders, heads, and sectors, as well as the numbering conventions associated therewith, are well defined features of hard disk drives, such as hard disk drive 5, and are readily familiar to those skilled in the art. The MBR includes information that identifies how and where an operating system is located on the hard disk such that the operating system can be booted (loaded) into the computer's main memory. The MBR is sometimes referred to as the "partition sector" or the "master partition table" because it includes a table that identifies the location of each partition that has been formatted onto the hard disk. In addition to the partition table, the MBR also includes a program that reads the boot sector record of the partition containing the operating system to be booted into system memory. In turn, that record contains a program that loads the rest of the operating system into system memory.

If the BIOS code finds a valid copy of the MBR in hard disk drive 5, the BIOS code starts the process of booting (loading) the operating system from hard disk drive 5 into RAM 14 using information in the MBR sector. If the first device that the system tries (floppy, hard disk, etc.) is not found, the BIOS will then try the next device in the sequence provided by the boot list. If no boot device can be found, the system will normally display an error message and then freeze the system.

From information in the boot list, the BIOS accesses the MBR in the first sector of hard disk drive 5. If the MBR is determined to be corrupted, by an MBR virus for example, the BIOS is unable to determine the partition format of hard disk drive 5. Conventionally, an external storage medium such as a floppy diskette is used to store a backup copy of the MBR in such a case. The present invention, as implemented within the computer system depicted in FIG. 1, provides an internally protected backup copy of the MBR that reduces the problems associated with maintaining an external backup.

Since the MBR is a small program (typically 512 bytes), a backup copy of the MBR is stored within flash memory 6. The original structure of the MBR is maintained, in accordance with one embodiment, by creating a virtual partition within flash memory 6 that is configured to correspond to head 0, cylinder 0, sector 1 of hard disk drive 5. In an alternate embodiment, a backup copy of the MBR is stored within a "hidden" partition within hard disk drive 5 that is inaccessible by the operating system. In a preferred embodiment of the present invention, the hidden partition is generated in accordance with an emerging standard known as Protected Area Run Time Interface Extension Services (PARTIES). A detailed description of PARTIES can be found with reference to NCIT 346, at Web page http://www.ncits.org/scopes/1367.htm, which is incorporated herein by reference.

Figure 2:
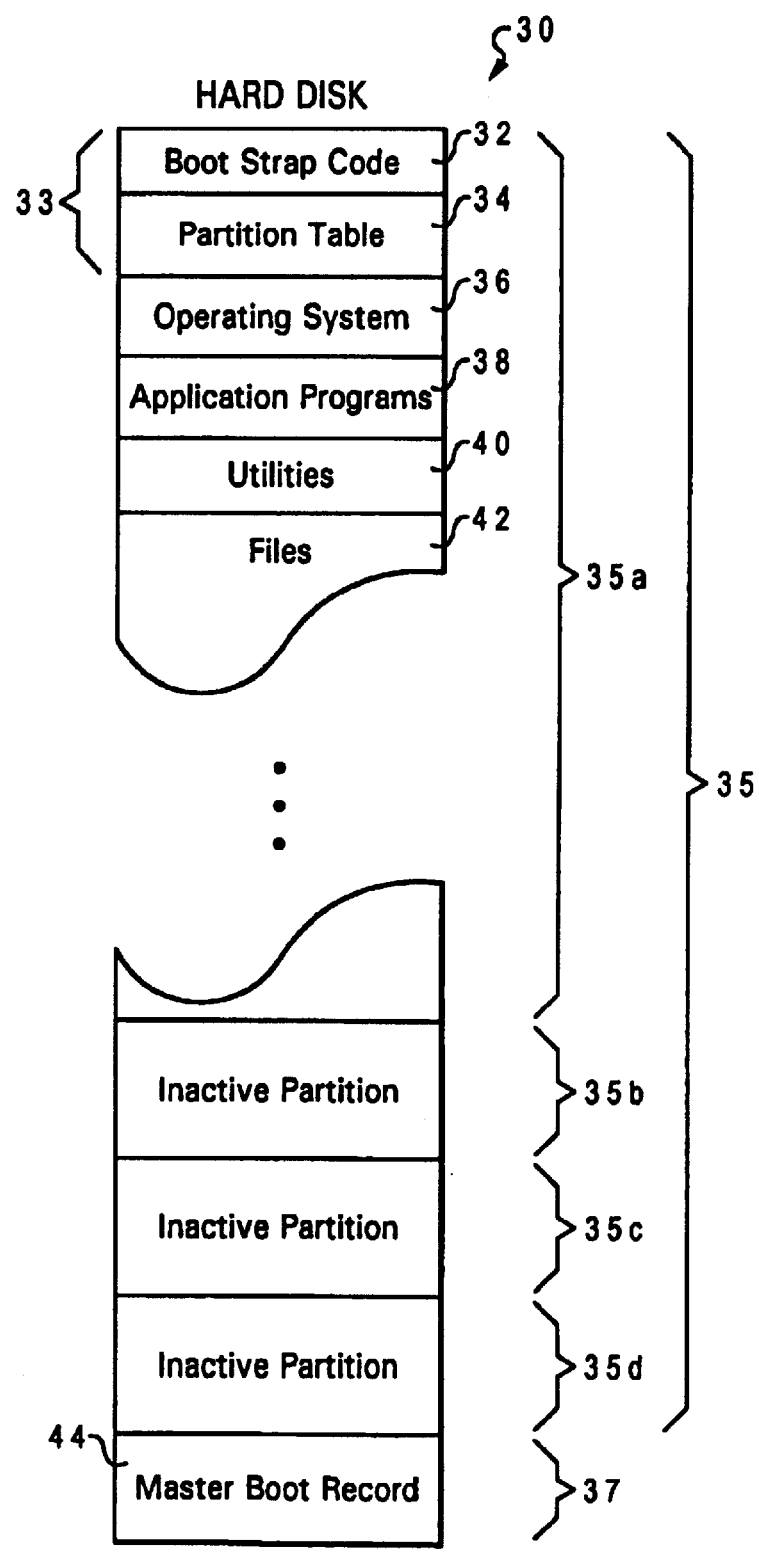
FIG. 2 is a representative illustration of a reserved partition within a hard disk wherein a copy of a master boot record is stored in accordance with a preferred embodiment of the present invention.

With reference to FIG. 2, there is depicted a representative illustration of a hidden partition 37 within a bootable hard disk 30 included within hard disk drive 5, wherein a copy of a master boot record 44 is stored in accordance with the code layer defined by PARTIES. Bootable hard disk 30 includes disk configuration information comprising MBR 33. A boot strap executable code 32 and a master partition table 34 are included within MBR 33 includes. As depicted in FIG. 2, bootable hard disk 30 is divided into a visible partition 35 and a hidden partition 37. As utilized herein "visible" is determined with respect to the operating systems ability to "see" and thus access a particular portion of bootable hard disk 30. The visibility of a given partition is determined by is inclusion or exclusion as an entry within master partition table 34. As further illustrated in FIG. 2, visible partition 35 is further subdivided into an active partition 35a, and three inactive partitions 35b, 35c, and 35d.

Both active and inactive partitions are included as entries within master partition table 34. An operating system utility asserts flags within master partition table 34 that represent whether a given partition is active (i.e., bootable) or inactive. MBR 33, as well as an operating system 36, application programs 38, utilities 40, and other data 42, are stored within sectors of active partition 35a, while MBR 44 is stored within hidden partition 37. In accordance with PARTIES, hidden partition 37 is not included as an entry within master partition table 34. Hidden partition 37 is thus rendered "invisible" to the operating system by using a hard file command (SETMAX, for example) that lowers the maximum sector address available to the operating system. The partitioning depicted in FIG. 2 essentially results in visible partition 35 and hidden partition 37 becoming logically separate entities on the same physical medium. Thus, a hidden partition as defined herein, qualifies as an alternative non-volatile storage device.

Figure 3:
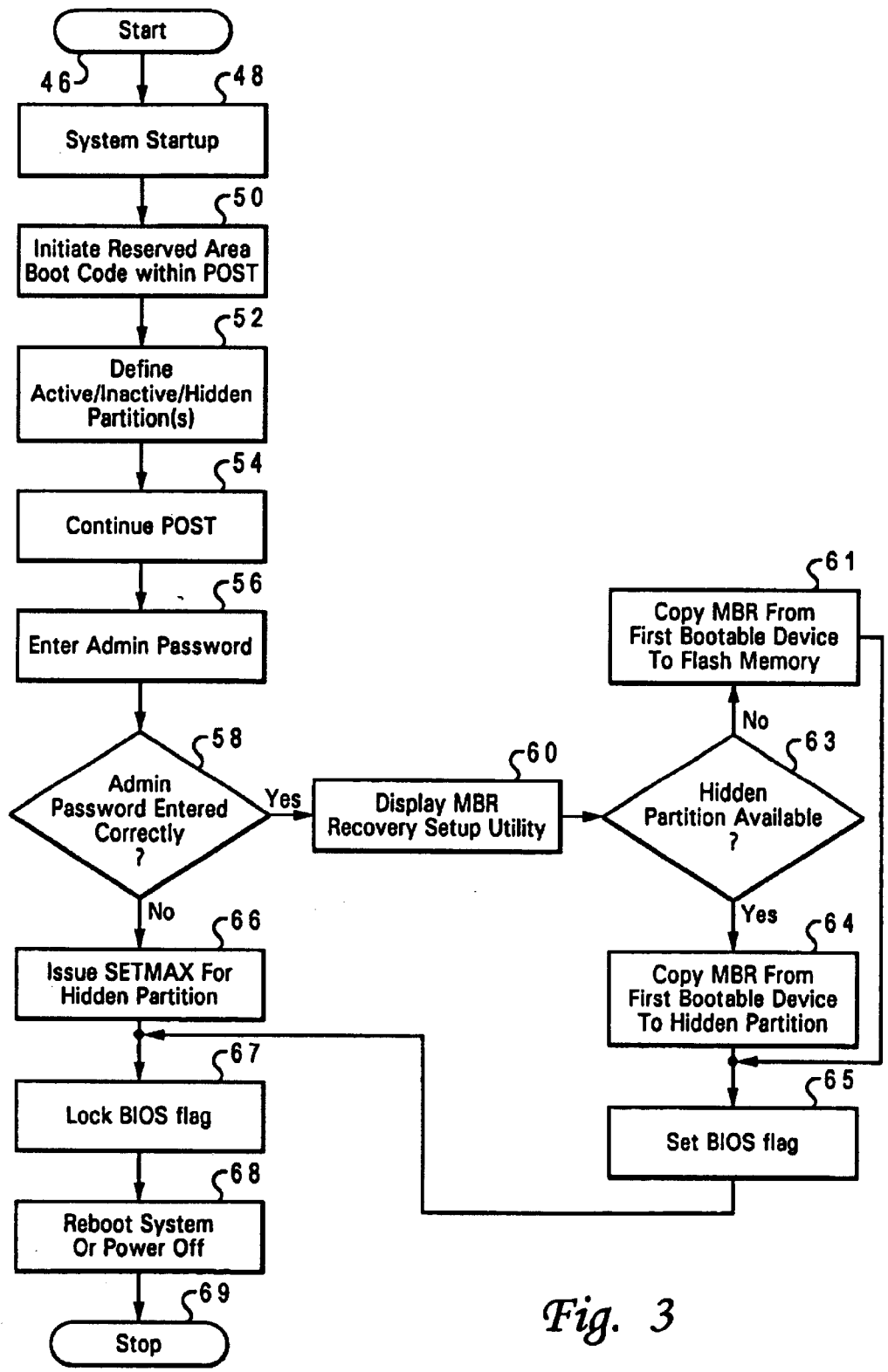
FIG. 3 is a flow diagram depicting steps performed during setup of a master boot record recovery utility in accordance with a preferred embodiment of the present invention.

Referring to FIG. 3, there is illustrated a flow diagram depicting steps performed during setup of a master boot record recovery feature in accordance with a preferred embodiment of the present invention. The process commences as shown at step 46 and proceeds to step 48 wherein a startup of the computer system and hard disk of FIGS. 1 and 2 is depicted. Next, as illustrated at steps 50 and 52 POST is initiated and multiple disk sectors within hard disk 30 are designated as either active or inactive accessible partitions or as being a hidden partition as defined by PARTIES. In accordance with a preferred embodiment of the present invention, the designation performed at step 52 includes executing reserved area boot code within POST. As part of the execution of the reserved area boot code, sectors on an alternative non-volatile storage device (e.g., hidden partition 37 or another physical hard disk) are defined as belonging to a reserved active partition, a non-reserved inactive partition or a hidden partition.

POST continues as illustrated at step 54, until a password is entered (step 56). In response to the system administrator password being correctly entered (i.e., matches a predetermined code sequence), the configuration utilities are booted at a menu displayed to the system administrator. The system administrator chooses the MBR recovery setup utility to enable the MBR recovery feature. At step 60, an MBR recovery setup utility is displayed to a user on display device 22. Next, as depicted at step 63, a determination is made of whether or not a hidden partition is available on hard disk 30. If not, and as shown at step 61 a copy of MBR 44 is delivered from the first bootable device in the boot list (i.e., from head 0, cylinder 0, sector 1 of hard disk 30) to flash memory 6. If a hidden partition is available, then as illustrated at step 64, MBR 44 is copied from the first bootable device to the designated hidden partition. It will be understood by those skilled in the art that an address space will be required for POST to identify where the hidden partition is located. Following step 61 or 64, a flag in the BIOS is set that indicates to the POST code that a copy of the MBR has been stored within the alternate non-volatile storage device (i.e., flash memory 6 in a virtual partition or hard disk drive 5 in a hidden partition) as depicted at step 65.

If the password was not entered correctly, or was not the system administrator password, a hard file command (SETMAX) is issued as shown at step 66 to lower the maximum sector address accessible to the operating system, thus effectuating the exclusion of hidden partition 37 as an entry within master partition table 34. Following either step 66 or 65, the BIOS flag for designated hidden partition 37 is locked from further access by the operating system (step 67). In a preferred embodiment, step 67 entails POST activating a read-only BIOS flag locking mechanism to prevent unauthorized setting or resetting of the BIOS flag. As depicted at steps 68 and 69, the process terminates with a reboot or power off sequence.

Figure 4:
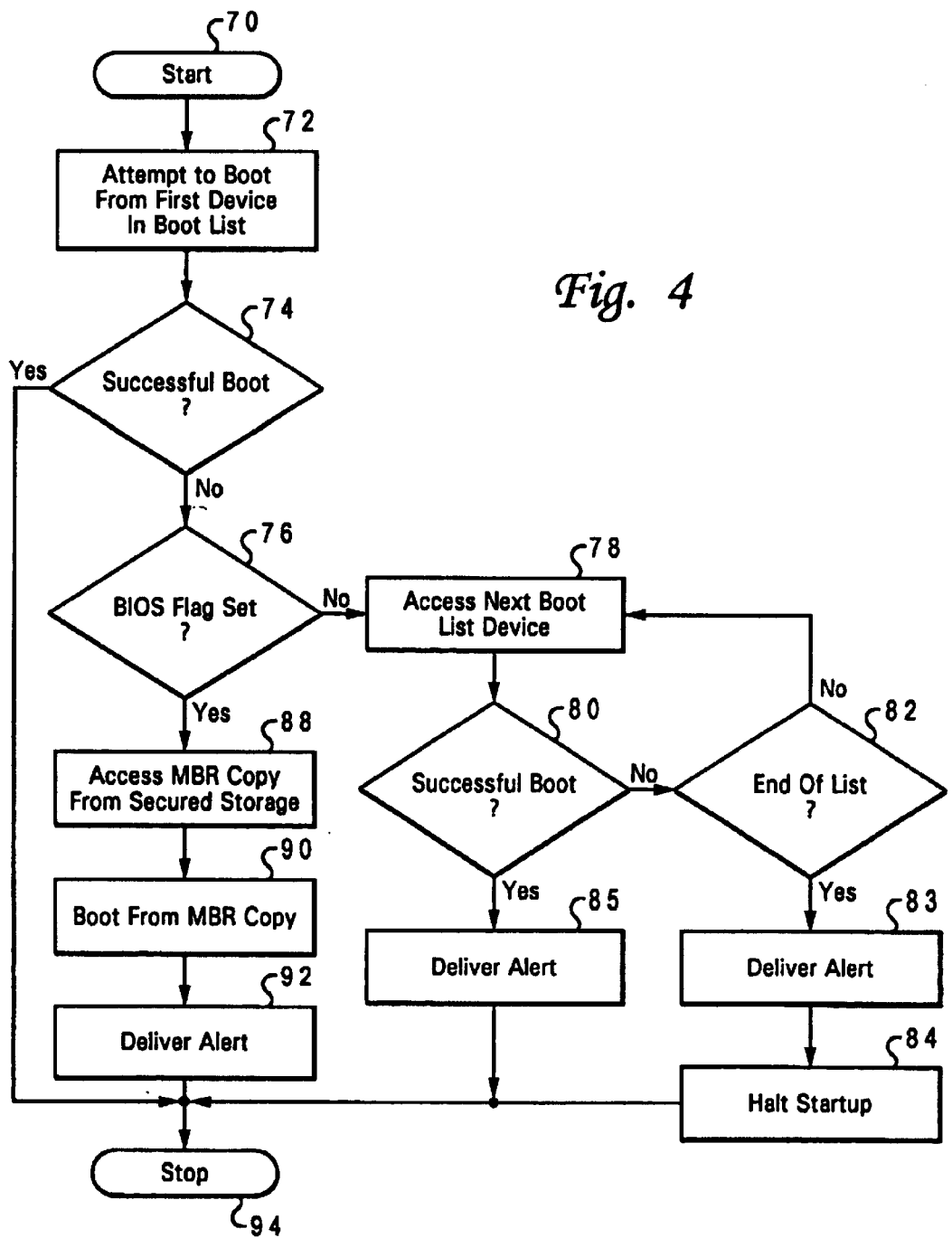
FIG. 4 is flow diagram depicting steps performed during master boot record recovery in accordance with a preferred embodiment of the present invention.

With reference to FIG. 4, there is illustrated a flow diagram depicting steps performed during master boot record recovery in accordance with a preferred embodiment of the present invention. The recovery process starts as shown at step 70 and proceeds to step 72 wherein a boot attempt from hard disk 30 (first device in the boot list) is depicted. If the boot is successful, the process stops as illustrated at steps 74 and 94. If, however, the boot fails due for example to a corruption of the MBR resident within head 0, cylinder 0, sector 1 of hard disk 30, a determination is made of whether or not the MBR recovery flag is set in the BIOS (step 76). In response to the recovery flag not being set, a next bootable device is selected from the boot list as depicted at step 78. If the subsequent boot attempt is successful, and as illustrated at steps 80 and 85, an alert is delivered on user display device 22. If the subsequent boot attempt from the next bootable device is unsuccessful and the end of the boot list has been reached, an alert is delivered on user display device 22 and the startup is halted as shown at steps 80, 82, 83, and 84.

Returning to step 76, in response to the recovery flag being set, the copy of the MBR within the alternative non-volatile storage device is accessed (step 88) and the boot process is commenced utilizing the backup MBR (step 90). If the computer system is included within a network such as a local area network (LAN), and as depicted at step 92, an alert is delivered to a system administrator in response to the access of the MBR copy, before the process terminates at step 94.

A method and system has been disclosed for recovering a master boot record within a data processing system. Software written according to the present invention is to be stored in some form of computer readable medium, such as memory, CD-ROM or transmitted over a network, and executed by a processor. Alternatively, some or all of the present invention could be implemented in hardware. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

While the invention has been particularly shown and described with reference to a preferred embodiment, it will be understood by those skilled in the art that various changes in form and detail may be made therein without departing from the spirit and scope of the invention.

What is claimed is:

1. A method for recovering a master boot record within a data processing system, said method comprising:
   invoking a master boot record recovery setup utility;
   in response to said invoking, storing a copy of said master boot record from a first bootable device to an alternate non-volatile storage device, wherein said first bootable device is a hard disk drive, and said alternate non-volatile storage device is a flash memory; and
   in response to a failed boot attempted from said first bootable device, accessing said copy of said master boot record within said alternate non-volatile storage device.

2. The method of claim 1, wherein said method further includes
   providing a Basic Input Output System (BIOS) in a non-volatile memory device within said data processing system;
   setting a flag within said BIOS indicative of said storing a copy of said master boot record from said first bootable device to said alternative non-volatile storage device.

3. The method of claim 2, wherein said method further includes
   including in said data storage system a boot list that points to a plurality of bootable devices;
   attempting to boot said data processing system from said first bootable device, wherein said attempting to boot includes accessing said master boot record within said first bootable device; and
   in response to a failure of said boot attempt:
      determining whether or not said flag is set;
      in response to said flag not being set, selecting a next bootable device from said boot list; and
      in response to said flag being set, accessing said copy of said master boot record from said alternative non-volatile storage device.

4. The method of claim 1, wherein said method further includes booting said data processing system utilizing said copy of said master boot record within said alternative non-volatile data storage device.

5. The method of claim 1, wherein said flash memory is an electronically erasable programmable read-only memory device.

6. The method of claim 1, wherein said first bootable device is a hard disk drive, and said alternative non-volatile storage device is a hidden partition within said hard disk drive or a hidden partition on another hard disk drive.

7. The method of claim 6, wherein said invoking is preceded by implementing a protected area run time interface extension service.

8. The method of claim 7, wherein said data processing system includes an operating system that is loaded during a boot of said data processing system, said implementing further includes
   during a system startup of said data processing system, invoking a Power On Self Test (POST) that includes a reserved area boot code, wherein said reserved area boot code includes instructions for:
      disabling visibility of said operating system to at least one partition within said hard disk drive; and
      during said POST, locating and executing said reserved boot code.

9. The method of claim 1, wherein said master boot recovery setup utility is stored within a Basic Input Output System (BIOS) code, said invoking further includes entering a system password that provides access to said master boot recover setup utility; and displaying said master boot recovery setup utility on a BIOS startup screen.

10. The method of claim 1, wherein said method further includes in response to said step of accessing said copy of said master boot record within said alternative non-volatile data storage device, delivering an alert signal to a system administrator.

11. A system for recovering a master boot record within a data processing system, said system comprising:

processing means for invoking a master boot record recovery setup utility;

processing means responsive to said invoking a master boot record recovery setup utility for storing a copy of said master boot record from a first bootable device to an alternate non-volatile storage device, wherein said first bootable device is a hard disk drive, and said alternate non-volatile storage device is a flash memory device; and processing means responsive to a failed boot attempted from said first boot device for accessing said copy of said master boot record within said alternate non-volatile storage device.

12. The system of claim 11, wherein a Basic Input Output System (BIOS) is included in a non-volatile memory device within said data processing system, wherein said system further includes processing means for setting a flag within said BIOS indicative of said storing a copy of said master boot record from a first bootable device to an alternative non-volatile storage device.

13. The system of claim 12, wherein said data storage system includes a boot list that points to a plurality of bootable devices, wherein said system further includes processing means for attempting to boot said data processing system from said first bootable device, wherein said attempting to boot includes accessing said master boot record within said first bootable device; and processing means responsive to a failure of said boot attempt for determining whether or not said flag is set;

in response to said flag not being set, selecting a next bootable device from said boot list; and in response to said flag being set, accessing said copy of said master boot record from said alternative non-volatile storage device.

14. The system of claim 11, wherein said system further includes processing means for booting said data processing system utilizing said copy of said master boot record within said alternative non-volatile data storage device.

15. The system of claim 11, wherein said flash memory is an electronically erasable programmable read-only memory device.

16. The system of claim 11, wherein said first bootable device is a hard disk drive, and said alternate non-volatile storage device is a hidden partition within said hard disk drive or a hidden partition on another hard disk drive.

17. The system of claim 16, wherein said system further includes processing means for implementing a protected area run time interface extension service.

18. The system of claim 17, wherein said data processing system includes an operating system that is loaded during a boot of said data processing system, wherein said processing means for implementing a protected area run time interface extension service further includes processing means for, during a system startup of said data processing system:

invoking a Power On Self Test (POST) that includes a reserved area boot code, wherein said reserved area boot code includes instructions for:

disabling visibility of said operating system to at least one partition within said hard disk drive; and locating and executing said reserved boot code during said POST.

19. The system of claim 11, wherein said master boot recovery setup utility is stored within a Basic Input Output System (BIOS) code, wherein said processing means for invoking a master boot record recovery setup utility further includes processing means for entering a system password that provides access to said master boot recover setup utility; and processing means for displaying said master boot recovery setup utility on a BIOS startup screen.

20. The system of claim 11, wherein said system further includes processing means responsive to said accessing said copy of said master boot record within said alternative non-volatile data storage device, for delivering an alert signal to a system administrator.

* * * * *